United States Patent
Bruns

(10) Patent No.: US 9,375,369 B2
(45) Date of Patent: Jun. 28, 2016

(54) VEHICLE LIFT WITH BIASING DEVICE

(75) Inventor: Gerit Bruns, Bad Zwischenahn (DE)

(73) Assignee: AMF-BRUNS GMBH & CO. KG, Apen (DE)

( * ) Notice: Subject to any disclaimer, the term of this patent is extended or adjusted under 35 U.S.C. 154(b) by 179 days.

(21) Appl. No.: 13/538,243

(22) Filed: Jun. 29, 2012

(65) Prior Publication Data

US 2013/0251489 A1  Sep. 26, 2013

(30) Foreign Application Priority Data

Mar. 21, 2012  (DE) ...................... 20 2012 002 832 U

(51) Int. Cl.
| | | |
|---|---|---|
| *A61G 3/06* | (2006.01) | |
| *B60P 1/48* | (2006.01) | |
| *B60P 1/64* | (2006.01) | |

(52) U.S. Cl.
CPC ................. *A61G 3/062* (2013.01); *B60P 1/483* (2013.01); *B60P 1/6472* (2013.01)

(58) Field of Classification Search
CPC ......... A61G 3/06; B60P 1/483; B60P 1/6472; B65G 60/00; B65G 37/02; B65G 49/085; B65G 2201/0267; B65G 1/00
USPC .................................................. 414/546, 921
See application file for complete search history.

(56) References Cited

U.S. PATENT DOCUMENTS

| | | | |
|---|---|---|---|
| 2,899,089 A | | 8/1959 | Ajero |
| 3,175,707 A | * | 3/1965 | Mathers ......................... 414/557 |
| 4,534,450 A | | 8/1985 | Savaria |
| 4,604,022 A | | 8/1986 | Bourgraf |
| 5,234,311 A | | 8/1993 | Loduha, Jr. et al. |
| 5,261,779 A | * | 11/1993 | Goodrich ....................... 414/546 |
| 5,575,140 A | * | 11/1996 | Bermes et al. ................. 56/14.7 |
| 5,806,632 A | * | 9/1998 | Budd et al. .................... 187/200 |
| 5,846,120 A | * | 12/1998 | Barton, Jr. .................... 446/434 |
| 5,944,473 A | * | 8/1999 | Saucier et al. ................ 414/546 |

(Continued)

FOREIGN PATENT DOCUMENTS

| | | |
|---|---|---|
| DE | 83 28 858 U1 | 1/1984 |
| DE | 34 38 079 A1 | 10/1985 |

(Continued)

OTHER PUBLICATIONS

European Patent Office, Search Report issued in European Patent Application No. 13160447.2 dated Jun. 21, 2013.

(Continued)

*Primary Examiner* — Ernesto Suarez
*Assistant Examiner* — Emery Hassan
(74) *Attorney, Agent, or Firm* — Wood, Herron & Evans, LLP

(57) ABSTRACT

A vehicle lift for a load, such as a wheelchair. The whole lift is movable between a first retracted position and a second extended position comprising a support pillar, a platform, a lifting device, and a biasing element. The platform is connected pivotably to the support pillar and has a horizontal pivot axis such that the platform is pivotable about the horizontal axis. The lifting device is hingedly connected to the support pillar and is configured for lifting and lowering the support pillar with the platform between the retracted position and the extended position. The biasing device biases the platform in to the second extended position and acts upon the region of the hinged connection between the platform and the support pillar.

7 Claims, 9 Drawing Sheets

(56) References Cited

U.S. PATENT DOCUMENTS

| | | | |
|---|---|---|---|
| 6,042,327 A * | 3/2000 | DeLeo et al. | 414/540 |
| 6,065,924 A * | 5/2000 | Budd et al. | 414/546 |
| 6,077,025 A * | 6/2000 | Budd et al. | 414/546 |
| 6,238,169 B1 * | 5/2001 | Dupuy et al. | 414/546 |
| 6,379,102 B1 * | 4/2002 | Kameda | 414/546 |
| 6,461,097 B1 * | 10/2002 | Ablabutyan et al. | 414/546 |
| 6,464,447 B2 * | 10/2002 | Dupuy et al. | 414/546 |
| 6,585,474 B1 * | 7/2003 | Kameda | 414/546 |
| 6,692,217 B1 * | 2/2004 | Pierrou | 414/539 |
| 6,705,824 B2 * | 3/2004 | Ablabutyan et al. | 414/546 |
| 6,739,824 B2 * | 5/2004 | Dupuy et al. | 414/546 |
| 6,837,670 B2 * | 1/2005 | Goodrich | 414/546 |
| 7,290,975 B2 * | 11/2007 | Richard et al. | 414/539 |
| 7,306,422 B2 * | 12/2007 | Dupuy et al. | 414/546 |
| 7,396,202 B1 * | 7/2008 | Panzarella et al. | 414/542 |
| 7,413,395 B2 * | 8/2008 | Goodrich | 414/546 |
| 7,419,349 B2 * | 9/2008 | Goodrich | 414/546 |
| 7,441,995 B2 * | 10/2008 | Sobota et al. | 410/94 |
| 7,445,416 B2 * | 11/2008 | O'Leary et al. | 414/546 |
| 7,509,187 B2 * | 3/2009 | Hayes et al. | 700/213 |
| 7,527,467 B2 * | 5/2009 | Edwards et al. | 414/537 |
| 7,556,467 B2 * | 7/2009 | Ablabutyan et al. | 414/557 |
| 7,621,546 B2 * | 11/2009 | Ross et al. | 280/166 |
| 7,798,761 B2 * | 9/2010 | Goodrich et al. | 414/462 |
| 7,815,413 B2 * | 10/2010 | Fisher et al. | 414/812 |
| 8,042,655 B1 * | 10/2011 | Ablabutyan et al. | 187/200 |
| 2001/0026756 A1 * | 10/2001 | Mortimore | 414/556 |
| 2001/0031195 A1 * | 10/2001 | Dupuy et al. | 414/546 |
| 2003/0021666 A1 * | 1/2003 | Dupuy | 414/546 |
| 2003/0082037 A1 * | 5/2003 | Khodkov | 414/546 |
| 2003/0095856 A1 * | 5/2003 | Ablabutyan et al. | 414/546 |
| 2004/0028513 A1 * | 2/2004 | Reynolds | 414/546 |
| 2006/0104775 A1 * | 5/2006 | Kasten et al. | 414/546 |
| 2006/0233632 A1 * | 10/2006 | Hayes et al. | 414/546 |
| 2007/0071569 A1 * | 3/2007 | Sobota et al. | 410/121 |
| 2007/0183880 A1 * | 8/2007 | Fisher et al. | 414/546 |
| 2007/0183881 A1 * | 8/2007 | O—Leary et al. | 414/546 |
| 2007/0224025 A1 * | 9/2007 | Ablabutyan et al. | 414/546 |
| 2009/0010744 A1 * | 1/2009 | Sobota et al. | 414/546 |
| 2009/0191037 A1 * | 7/2009 | Ablabutyan et al. | 414/546 |
| 2014/0105711 A1 * | 4/2014 | Gallingani et al. | 414/546 |

FOREIGN PATENT DOCUMENTS

| | | |
|---|---|---|
| DE | 20309868 U1 | 11/2004 |
| EP | 0955029 A2 | 11/1999 |
| EP | 1 369 299 A1 | 12/2003 |
| GB | 2 480 489 A | 11/2011 |
| WO | WO 2011130431 A2 * | 10/2011 |

OTHER PUBLICATIONS

Dr. Alf Harnisch; Search Report issued in German Application No. 20 2012 002 834.4; Nov. 7, 2012; 5 pages; German Patent Office.
European Patent Office, Official Action issued in Application No. 13 160 447.2-1651 dated May 22, 2014.

* cited by examiner

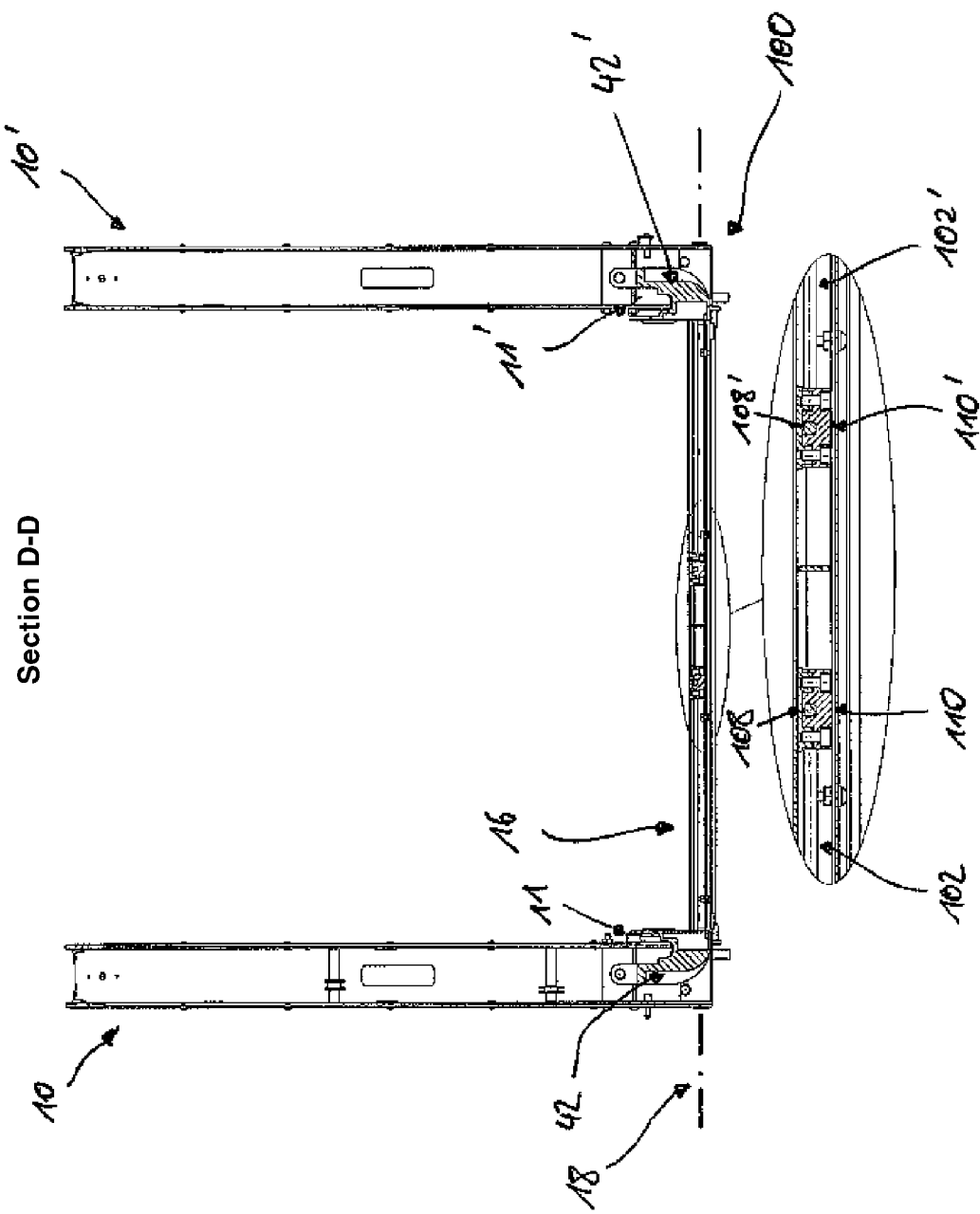

VEHICLE LIFT WITH BIASING DEVICE

TECHNICAL FIELD

The invention concerns a vehicle lift for loads, in particular wheelchairs.

BACKGROUND

Vehicle lifts fitted to vehicles have long been known. They serve to convey articles or people from the interior of the vehicle to the exterior and back again if there is a difference in level between the level of the interior of the vehicle and the location at which the articles or people are to be placed, or if there is a gap which has to be bridged over. An important application for such vehicle lifts is in vehicles in which wheelchair users are transported. Such a vehicle lift of the general kind set forth, to the present applicant, is disclosed for example in DE 203 09 868 U1.

Known vehicle lifts have a platform which is pivoted movably to at least one support pillar and is moved by means of a lifting device. In general a distinction can be drawn between at least two main positions. The first retracted position is the retracted position, during which the vehicle lift is not used. The platform is then generally in a vertical position so that the entire vehicle lift takes up as little room and space as possible and does not interfere while travelling with the vehicle.

In the second extended position, the vehicle lift is extended and the platform is disposed substantially horizontally near the ground so that for example a wheelchair user can easily move from the ground on to the platform. In most cases, there is also an intermediate position in which the platform is approximately at the level of a vehicle interior so that for example a wheelchair user can travel from the platform into the vehicle interior. Between the intermediate position and the second extended position the platform is lowered substantially parallel to itself by means of the lifting device.

Consequently, for moving the vehicle lift from the retracted to the extended position, the platform, on the one hand, has to be moved from the vertical position into the horizontal position and, on the other hand, it has to be lowered to a ground level so that, for example, wheelchair users can easily roll onto the platform. In that respect, it is desirable for the lifting devices to provide adequate power to lift relatively heavy loads by means of the vehicle lift, while also being of dimensions which are as small as possible so that weight and power consumption of the vehicle lift are low. A critical point in that respect is the start of moving the vehicle lift from the first retracted position to the second extended position.

In known lift devices, for example, coil springs are used to lower weight and power consumption. For instance, coil springs engage a pivot connection point between the lifting device and the corresponding vehicle to assist with the movement of the vehicle lift from the first retracted position to the second extended position. However, these coil springs have to be of large dimensions because of the high moments required. On the other hand, such coil springs can suffer from defects, for example, due to fatigue, which requires dismantling substantially the entire lift for maintenance or replacement of the springs. Such maintenance or replacement is often complicated, expensive, and generally undesirable.

Therefore the object of the present invention is to provide a vehicle lift of the kind set forth in the opening part of this specification, which is at least improved in respect of one of the above-mentioned problems. In particular the object of the invention is to provide a vehicle lift which can be reliably and effectively moved from the first retracted position to the second extended position and which also involves a low level of maintenance.

SUMMARY

In an embodiment of a vehicle lift, which can be moved at least into a retracted position and an extended position, the vehicle lift comprises at least one support pillar, a platform pivoted movably to the at least one support pillar about a horizontal axis. Furthermore, the vehicle lift includes at least one lifting device hingedly connected to the support pillar for lifting and lowering the support pillar together with the platform. There is provided a biasing device for biasing the vehicle lift into the second extended position, which acts in the region of the hinged connection between the platform and the support pillar.

The invention is based on the realization that in particular the start point when moving the vehicle lift from the first to the second position is critical. The invention is further based on the realization that it is not necessary for the movement when going from the first position to the second position to be completely assisted, but that it is sufficient for it to be assisted only in a certain range. It has proven to be particularly effective if the biasing device engages the hinged connection between the platform and the support pillar. The biasing device arranged for biasing the vehicle lift into the second extended position accordingly biases the platform in such a way that it is biased automatically, at least in a certain pivotal angle, from the first retracted position, in which the platform is arranged substantially vertically, in a direction towards the second extended position, in which the platform is arranged substantially horizontally. If the platform is already assisted by the biasing force, and moves a bit from the first retracted position into the second extended position, the remaining movement can be effected solely by the weight of the platform. Consequently, it is possible for the biasing device to be of substantially smaller dimensions, whereby the vehicle lift weight is also reduced. In addition, the fact that the biasing device engages in the region of the hinged connection between the platform and the support pillar substantially simplifies maintenance.

In a first preferred embodiment, the biasing device has at least one spring element. Spring elements are simple components which do not require additional energy and involve only slight maintenance.

Preferably, the at least one spring element is in the form of a torsion spring. In particular, a torsion spring can be advantageously used as the biasing device, because it acts in the region of the hinged connection between the platform and the support pillar. This hinged connection is preferably in the form of a pivotable connection. The use of torsion springs, such as a leg spring, is particularly preferred; however, it will be appreciated that it would also be possible to use tension or compression springs. However, in particular, the structure is also substantially simplified if torsion springs are used. Such a torsion spring is preferably in the form of a leg spring. In the case of the leg spring, preferably a first leg engages the support pillar and a second leg engages the platform so that the energy stored in the torsion spring can be used in the form of moments for biasing the vehicle lift into the second extended position.

Particularly preferably, the at least one spring element is in the form of a torsion bar spring. Torsion bar springs are less susceptible to failure than coil springs, because of substantially lower or eliminated flexural loading within the spring. As a result, maintenance intervals can be made longer in order to substantially simplify maintenance. In addition, torsion bar springs of a suitable design configuration, involving a compact structure, can be used to store more energy than coil springs, whereby the structure is simplified and weight can also be saved.

In a preferred embodiment, the torsion bar spring has a spring body and two legs extending from the spring body for applying moments to the spring body. Thereby, special clamping means are eliminated, because the two legs provide moments that can be applied to the spring body in a simple fashion.

Preferably, the spring element is in engagement with a first portion with the support pillar and is in engagement with a second portion with the platform. Preferably, in that case the first leg engages the support pillar and the second leg engages the platform. Thereby, the moments can be particularly effectively applied and the biasing device is of an efficient and low-maintenance configuration.

More preferably the spring body is arranged substantially in a plane of the platform to provide a particularly space-saving arrangement.

Preferably, in that case, the spring body extends substantially over the entire length along the platform. Preferably, the spring body extends substantially parallel to the pivot axis of the platform along same. That permits particularly effective application of forces and the spring body or the entire torsion bar spring can be arranged on the platform in space-saving fashion. Particularly preferably, the spring body is arranged at the underside of the platform. The term "underside" refers here to the side of the platform, which in the second extended position, preferably bears against or is towards the ground. In that way, the torsion bar spring does not bear against the region of the platform over which, for example, a wheelchair user passes, and thus does not interfere therewith. The torsion bar spring is thus easily accessible when the vehicle lift is in the first retracted position. As a result, on the one hand, the structure of the vehicle lift is compact while, on the other hand, maintenance is also substantially simplified.

In a further preferred embodiment, the vehicle lift has two support pillars, which are respectively pivoted hingedly to the platform, and the biasing device has two spring elements. Preferably, in that case, a first spring element co-operates with the first support pillar and a second spring element co-operates with the second support pillar. Preferably, both spring elements are in the form of torsion bar springs and extend with their spring bodies at the underside of the platform. In that way, the platform is more uniformly loaded and can be easily biased. In addition, in that way the biasing device is at least partially of a redundant configuration, and the mode of operation is still at least partially ensured even upon the failure of one of the two spring elements.

Preferably, the lifting device has a parallelogram linkage having at least two support arms, which are arranged in substantially mutually parallel relationship and which are respectively pivoted with one end to the support pillar and with the other end to a vehicle-side fixing portion. Such a parallelogram linkage is known in principle for example also from above-mentioned DE 203 09 868 U1 and can advantageously be used for moving the vehicle lift. If there are two support pillars, there are preferably also two parallelogram linkages. As an alternative to the parallelogram linkage, it would also be possible to use other lifting devices such as for example purely hydraulic, pneumatic, electric, or also other mechanical lifting devices such as for example, various pull cable arrangements and the like.

In a further preferred embodiment, the at least one support pillar and/or the support arms are in the form of aluminum profile members. Because the support pillar and/or the support arms are in the form of aluminum profile members, no weld seams or other joining process steps are required. Preferably, the support pillar is in the form of a curved aluminum profile member. Preferably, the at least one support pillar and/or the support arms are completely in one piece to substantially simplify, on the one hand, manufacture of the vehicle lift while eliminating, on the other hand, critical connecting locations to improve the service life and also the reliability of the vehicle lift. Also, the weight of the vehicle lift is substantially reduced and the visual impression of the support pillar and thus the entire vehicle lift is substantially improved. The appearance of the vehicle lift creates a gently curved, pleasing and sporty impression caused by the integral curved structure of the support pillar. If the at least one support pillar is in the form of an integrally curved support pillar, it will be appreciated that any other material, such as for example steel, is also preferred, though aluminum is particularly preferred with regard to a weight saving.

It is further preferred to provide a mechanism for pivoting the platform, the mechanism engaging the support and/or the platform. The mechanism is intended to pivot the platform from the first retracted position in which the platform is oriented, substantially vertically, into the horizontal, in which the platform is arranged in the second extended position. According to one embodiment of the invention, the pivotal movement is assisted by the biasing device in a first pivotal portion. Consequently, the lifting device is provided for lifting and lowering the platform and the mechanism is provided only for pivoting the platform.

Preferably, the mechanism for pivoting the platform has an elbow lever having a first leg and a second leg connected thereto in an elbow-hinged relationship wherein the first leg is pivoted to the support pillar and the second leg is pivoted to the support. Such an elbow lever is a particularly simple way of pivoting the platform. For example, when moving the vehicle lift from the first to the second extended position, the elbow joint, on which there is preferably provided a slide shoe, can come into contact with one of the support arms of the parallelogram linkage to pivot the platform.

Particularly preferably, the second leg is in the form of a thrust rod, wherein joint elements are arranged at both ends adjustably relative to the thrust rod. By way of example, the joint elements are connected to the thrust rod by means of opposite-pitch threads wherein one joint element forms a part of the elbow joint and the second joint element is pivoted to the platform and/or to the support. Thus, the two joint elements are movable, towards and away from each other, for example, by means of rotation of the thrust rod. Thus the two joint elements are adjustable relative to each other and make it possible to adjust a pivotal angle of the platform upon movement from the first retracted position into the second extended position. Depending on the respective type of vehicle and the installation situation, that angle of installation can vary so it is advantageous for that pivotal angle to be adjustable in a simple fashion.

In a further preferred embodiment, arranged on the platform are two side plates, which each have a respective stamping. Side plates serve, on the one hand, for laterally guiding wheelchairs travelling, for example, on to the platform, which enhances the safety aspect of the vehicle lift. On the other hand, the side plates also serve to stabilize the platform so that it does not flex under load. For that purpose, the side plates are preferably arranged substantially perpendicularly to the plane formed by the platform. By stampings being provided in the side plates, the stiffness of the latter is increased so that the side plates and the platform itself can be made with smaller material thicknesses, thereby reducing the weight of the vehicle lift. The stamping is preferably formed along a longitudinal axis of the side plates.

In a preferred embodiment, at least one support for supporting moments in relation to the support pillar is arranged on the platform. Moments caused by loads on the platform about the hinged connection between the platform and the support pillar have to be supported. For that purpose, the support is preferably fixedly mounted to the platform and has a contact portion with which it comes into contact with the support pillar in order in that way to support moments in relation thereto. Preferably, the support is in the form of a free-form part and/or casting to further reduce the weight of the vehicle lift.

Preferably, the support is provided to limit a pivotal movement of the platform relative to the support pillar by an abutment on the support coming into contact with the support pillar, wherein the application of force to the support pillar takes place in a central portion of the support pillar, preferably substantially centrally with respect to a direction perpendicular to the longitudinal axis of the support pillar. Preferably, the application of force occurs in the region of a back of the support pillar which is substantially U-shaped in cross-section, and, preferably, between the two legs of the U-shaped support pillar and not at one of the legs. Thus, the application of force to the central region of the support pillar, with respect to a direction perpendicular to a longitudinal axis is preferably, substantially in a horizontal center of the support pillar to avoid twisting of the support pillar. The abutment on the support is preferably provided on a projection extending in an arm shape from the platform in the direction of the support pillar. Thereby, the application of force at the center of the support pillar is advantageously possible, and particularly preferred if the support pillar is in the form of an aluminum profile member.

It is further preferred for a reinforcing profile member to be arranged on the support pillar for co-operating with the abutment on the support. This arrangement is particularly advantageous if the support pillar is made from aluminum. Aluminum is a lightweight material of low density, but, because of these properties, impact and abrasion loadings can lead to more rapid wear under some circumstances. Therefore, the reinforcing profile member is preferably arranged on the support pillar to protect the material. The reinforcing profile member can be arranged internally, for example, in the U-shaped region of the support pillar. Preferably, the reinforcing profile member is joined to the support pillar by means of a screw connection. The reinforcing profile member is preferably provided in the form of a wearing component. Thus, in a wear situation, only the reinforcing profile member has to be replaced while the support pillar remains intact. As a result, on the one hand, costs are reduced while, on the other hand, repair or maintenance of the vehicle lift is simplified. The reinforcing profile member preferably is comprised of aluminum; however, in the alternative, the reinforcing profile member may be comprised of another metal or plastic material.

BRIEF DESCRIPTION OF THE DRAWINGS

The invention is described in greater detail hereinafter by means of an embodiment by way of example with reference to the accompanying Figures in which:

FIG. 8 is a cross-sectional view D-D in FIG. 6.

DETAILED DESCRIPTION

Figure 1:
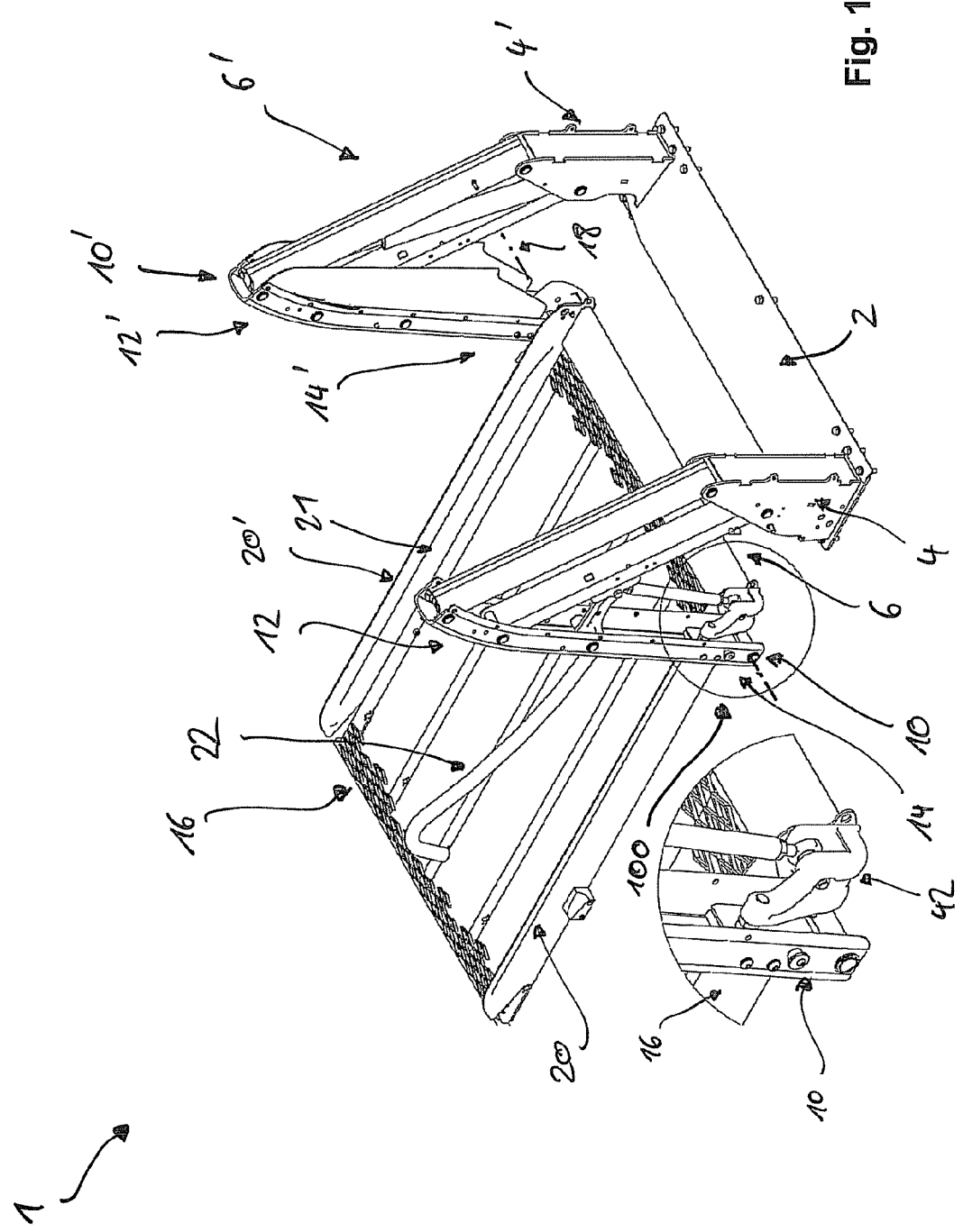
FIG. 1 is a perspective view of a vehicle lift in the intermediate position.

FIG. 1 shows a perspective view of a vehicle lift 1 in a position referred to as the intermediate position. Two stands 4, 4' which are of mirror-symmetrical relationship to each other, are fixed on a bottom plate 2. The bottom plate 2 and the stands 4, 4' together form a holding portion at the vehicle side. Arranged on the stands 4, 4' are respective lifting devices 6, 6' which in this embodiment is in the form of a parallelogram linkage. Arranged on the lifting devices 6, 6' (which are described in greater detail hereinafter) at the end opposite to the stands 4, 4' are respective support pillars 10, 10'. The support pillars 10, 10' (see also FIG. 6) have upper portions 12, 12' and lower ends or portions 14, 14'. The support pillars 10, 10' are connected to the lifting devices 6, 6' with the upper portions 12, 12'. At the lower portions 14, 14', a platform 16 is connected pivotably about the pivot axis 18 to the support pillars 10, 10' by means of a shaft 19. For biasing the platform 16 into the second extended position, there is a biasing device 100 which engages in the region of the hinged connection between the platform 16 and the support pillars 10, 10'. The biasing device 100 is described in greater detail hereinafter, in particular with reference to FIGS. 4 through 9.

Side plates 20, 20' are arranged at each of the lateral edges on the platform 16, wherein a stamping 21 (shown only in relation to one side plate 20') is provided along a longitudinal axis. A handle 22 is also arranged on the support pillar 10. A wheelchair user who is being transported by means of the vehicle lift 1 can hold fast to that handle 22 during transport. The support pillars 10, 10' are in one piece and are of a curved configuration along its longitudinal axis in the upper portions 12, 12'. The support pillars 10, 10' are in the form of aluminum profile members of a substantially U-shaped cross-section.

Figure 2:
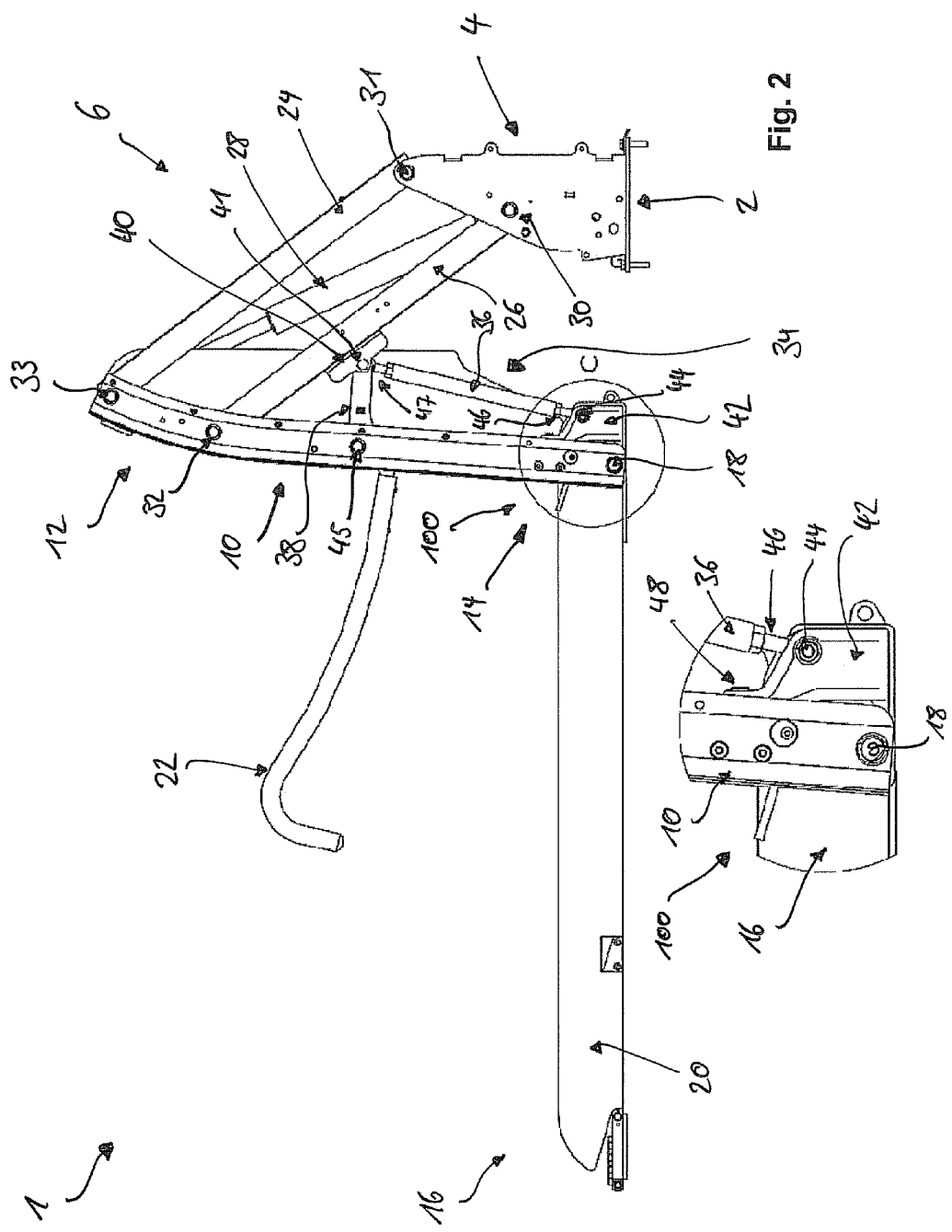
FIG. 2 is a side view of the vehicle lift in the intermediate position.

As shown in FIG. 2, the lifting devices 6, 6' are in the form of parallelogram linkages. Each has a first support arm 24 and a second support arm 26 arranged parallel to each other. Both support arms 24, 26 are hingedly connected to the stand 4 and also to the support pillar 10 by means of the pivot points 30, 31, 32, 33. All pivot points 30, 31, 32, 33 are in the form of plug-in pin connections. At the pivot points 32, 33 arranged in the support pillar 10, bushings (not shown) are additionally introduced here into the bores on the support pillar 10 to prevent wear at the support pillar 10.

The two support arms 24, 26 are equal in length and are of substantially identical configuration. The pivot points 30, 31 on the stand 4 are selected such that the support arms 24, 26 forming the parallelogram can be moved into a first retracted position and a second extended position (not shown). In the first retracted position, the two support arms 24, 26 are arranged substantially perpendicularly (see FIG. 4). In the second extended position (not shown), the support arms 24, 26 are arranged substantially horizontally. Moreover, the pivot points 32, 33 on the support pillar 10 are suitably arranged in displaced relationship in order to permit the parallelogram of the lifting device 6. The upper portion 12 of the support pillar 10 is of a curved configuration such that the displacement between the pivot points 32, 33 is compensated. The lower portion 14 of the support pillar 10 is substantially straight to permit a compact structure which also saves on weight.

A hydraulic cylinder 28 is provided for actuating the lifting device 6. The hydraulic cylinder 28 is arranged diagonally in the parallelogram formed by the support arms 24, 26. For the purpose of actuating the hydraulic cylinder 28, the hydraulic cylinder 28 is connected, on the one hand, to the pivot point 30 and on the other hand to the pivot point 33. Upon extension of the hydraulic cylinder 28, the vehicle lift is accordingly moved into the first retracted position, and, correspondingly upon retraction of the hydraulic cylinder 28, it is moved into the second extended position as is readily apparent in FIG. 2.

A mechanism 34 for pivoting the platform 16 is also arranged on the vehicle lift 1. The mechanism 34 has a first leg 38 which is pivotably attached to the support pillar 10 and a second leg 36 connected to the first leg 38 by means of a joint 40. A slide shoe 41 is further arranged at the elbow joint 40. The other end of the second leg 36 co-operates with the platform 16. For that purpose, arranged on the platform 16 is a support 42 for supporting moments in relation to the support pillar 10. The support 42 is engaged by the second leg 36 by being hingedly connected thereto by means of a joint 44.

The corresponding joint portions 46, 47 of the second leg 36, which is in the form of a thrust rod, are fixed thereto displaceably relative to each other. As is readily apparent from FIG. 2, the slide shoe 41 comes into contact with the second support arm 26 when the vehicle lift 1 is moved into the first retracted position. In that case, a force acts by way of the second leg 36 on the support 42 and, thus, on the platform 16 in such a way that it is pivoted into the vertical about the pivot axis 18. In contrast, upon extension of the vehicle lift 1, the slide shoe 41 loses contact with the second support arm 26 as from a given extension point (for example as from the intermediate position as shown in FIG. 2). In order then to prevent further lowering movement of the platform 16, is an arm-shaped projection 48 is arranged on the support 42. The arm-shaped projection 48 serves as an abutment and which limits a pivotal movement of the platform 16 relative to the support pillar 10 by the projection 48 coming into contact with a reinforcing profile member 50 (see FIG. 3). As can be seen in particular from the detail in FIG. 3, arranged on the projection 48 is a screw 49, which serves as an adjustable abutment. That makes it possible to adjust the pivotal angle, from which the pivotal movement of the platform 16 relative to the support pillar 10 is limited. For that purpose, the reinforcing profile member 50 is screwed to the support pillar 10 by means of two screw connections 51, 52. The shaft 19 defining the pivot axis 18 is also received in the reinforcing profile member 50 and is fixedly clamped therein with a clamping means 54. For that purpose, the shaft 19 has a flattened region so that the reinforcing profile member can engage it in a positively locking relationship.

Figure 3:
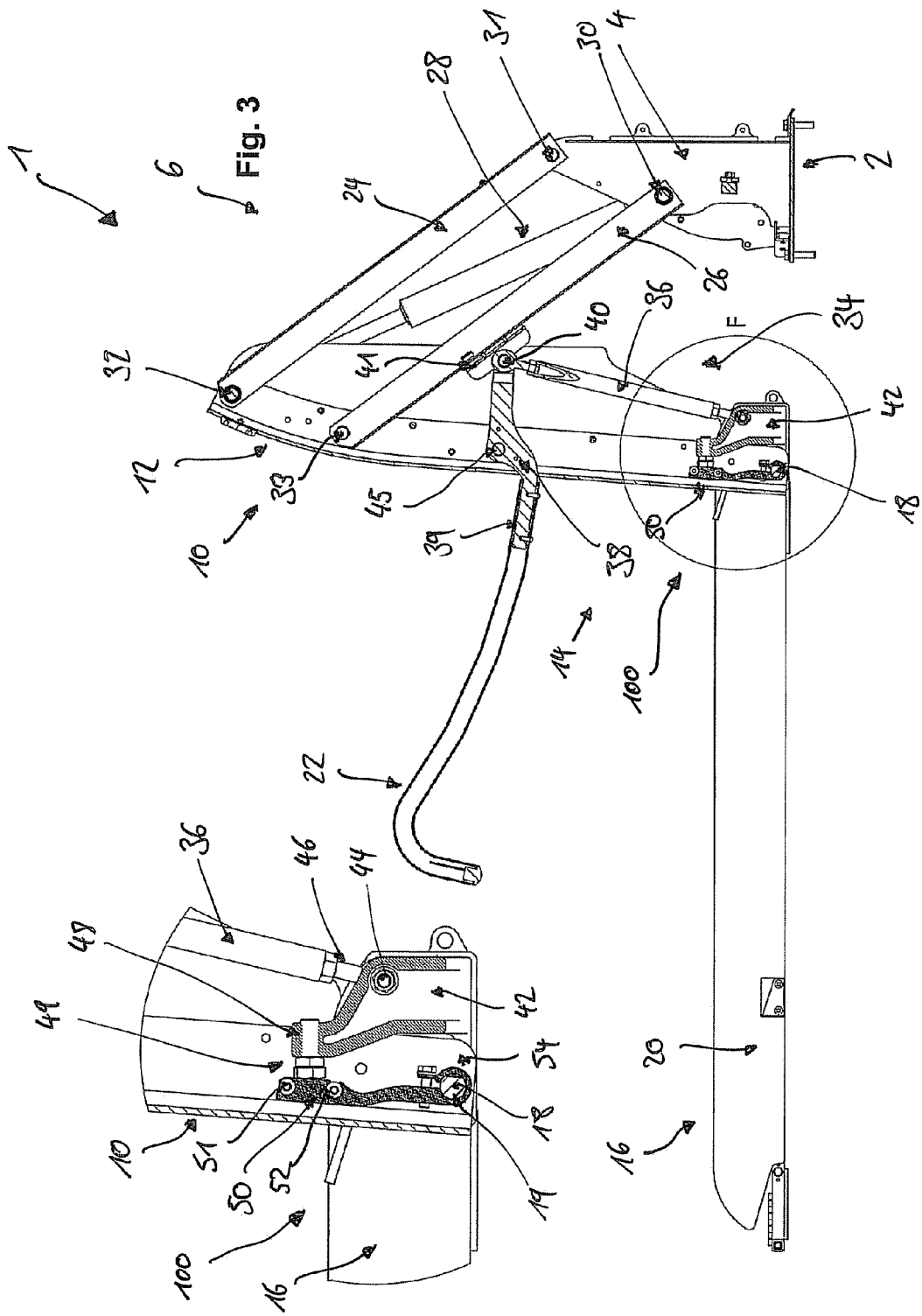
FIG. 3 is a cross-sectional view through the vehicle lift in the intermediate position.

As can be seen in particular from FIG. 3, the first leg 38 of the mechanism 34 extends through the support pillar 10 beyond a pivotal mounting 45. The handle 22 is fixed to that portion 39 which extends beyond the support pillar 10. Thus, in the movement from the first retracted position into the second extended position or from the second extended position into the first retracted position of the vehicle lift 1, the handle 22 is automatically movable therewith and is disposed in a vertically, upwardly pivoted condition in the first retracted position. Because the handle 22 is of the curved shape shown in FIG. 3, the handle 22 fits substantially to the curved portion 12 of the support pillar 10 so that the vehicle lift 1 is particularly compact.

Figure 4:
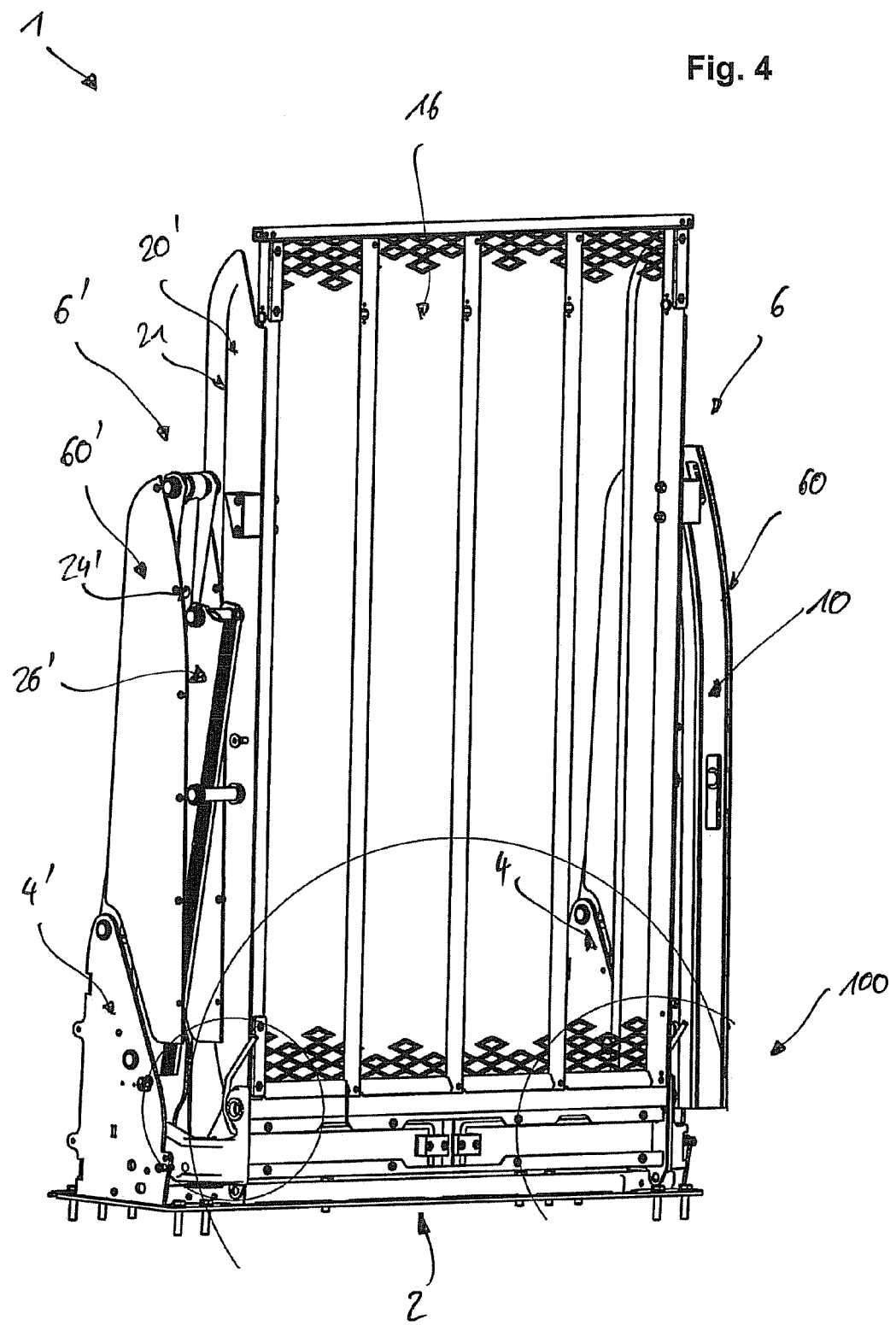
FIG. 4 is a perspective view of the vehicle lift in the retracted position.

In FIG. 4 illustrating the first retracted position of the vehicle lift 1, side plates 60, 60', are arranged laterally on the lifting device 6. That serves on the one hand to reduce the risk of injury insofar as it prevents, for example, operators trapping fingers between the support arms 24, 26. On the other hand the side plate 60, 60' has visual reasons. For illustration purposes, the support pillar 10' which is at the left in relation to FIG. 4 is omitted from FIGS. 4 and 5 so that the support arms 24', 26' are visible. Thus, only the right-hand support pillar 10 is illustrated.

Figure 5:
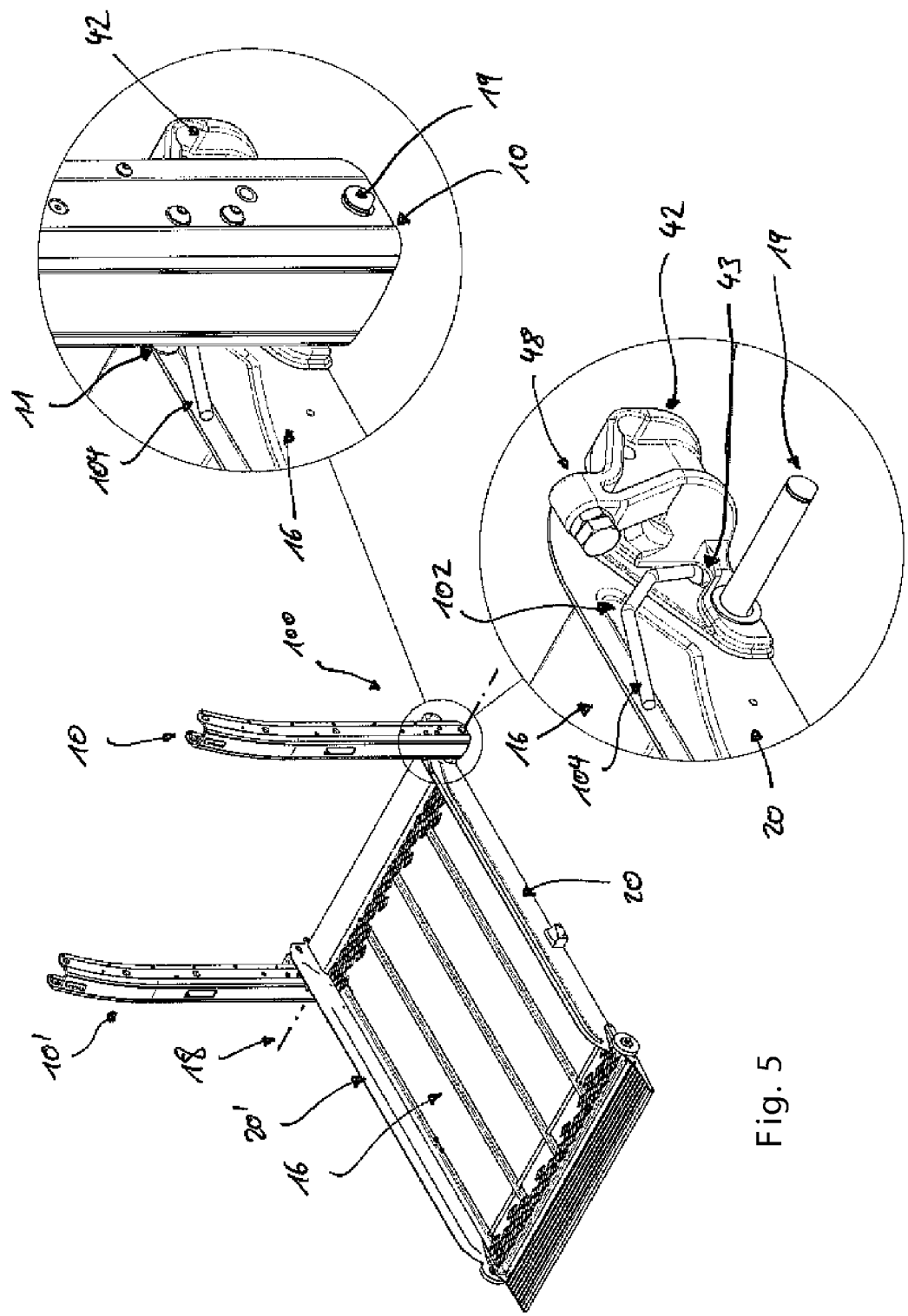
FIG. 5 is a perspective view of two support pillars with a platform, and two detail views.
Figure 6:
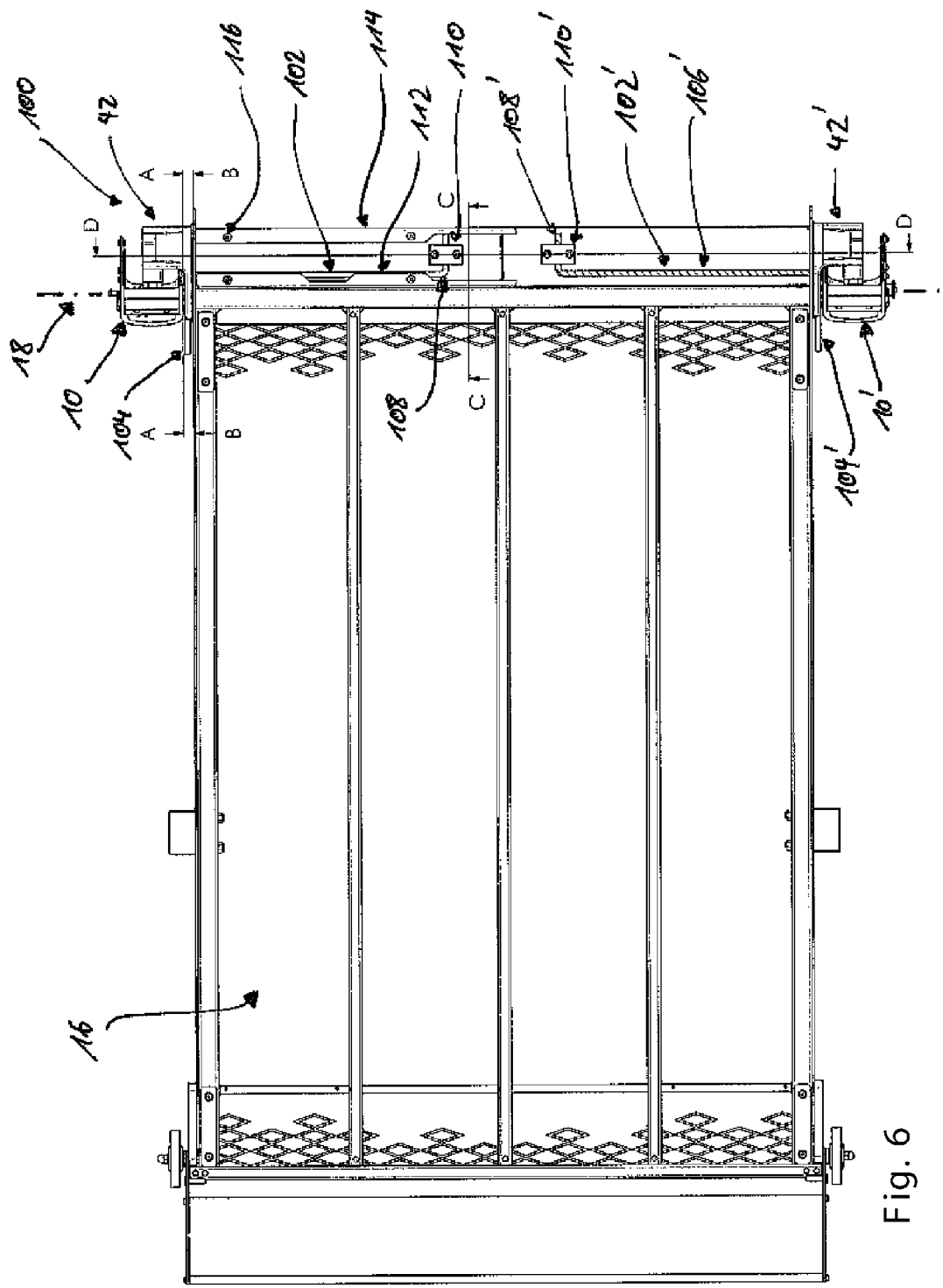
FIG. 6 is a view from below the arrangement of FIG. 5.
Figure 7C:
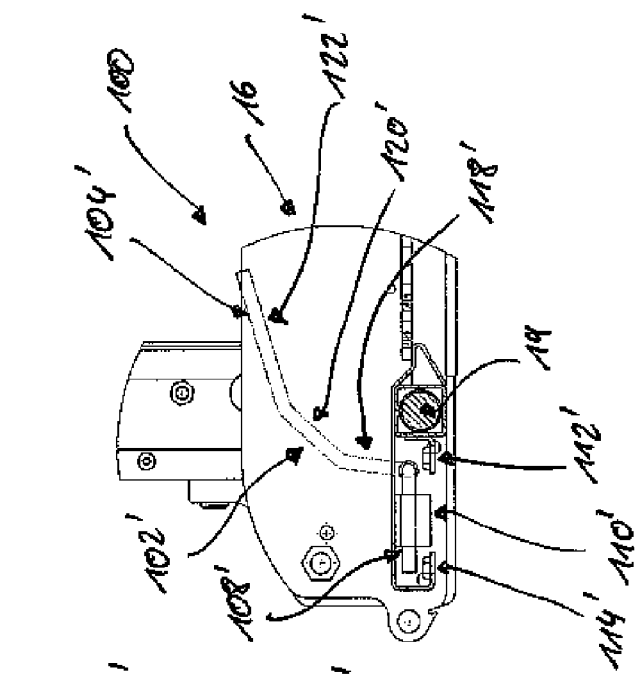
FIG. 7*c* is a cross-sectional view C-C in FIG. 6.
Figure 7B:
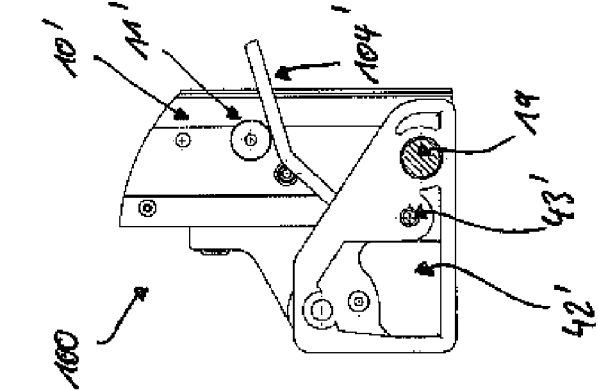
FIG. 7*b* is a cross-sectional view B-B in FIG. 6.
Figure 7A:
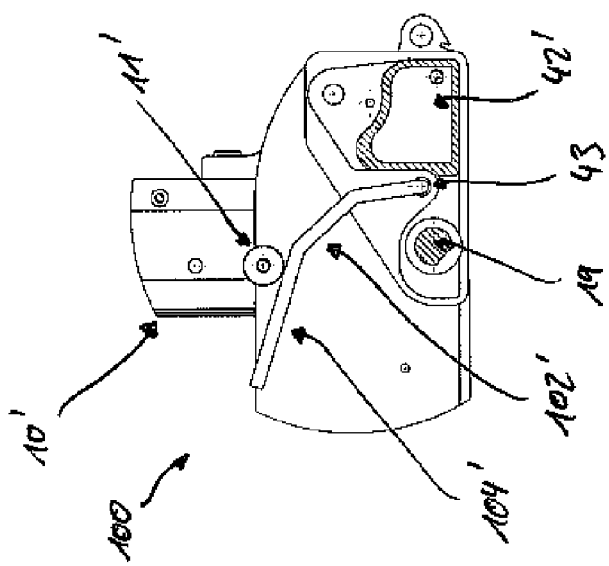
FIG. 7*a* is a cross-sectional view A-A in FIG. 6.

In this preferred embodiment of the invention, the biasing device 100 has two torsion bar springs 102, 102' of a symmetrical configuration (only one is shown in FIG. 5) which respectively extend at the underside of the platform 16 (see in particular FIG. 6). The biasing device 100 is intended to bias the pivotable connection between the platform 16 and the support pillars 10, 10' about the pivot axis 18 into the second extended position shown in FIG. 5.

Figure 9:
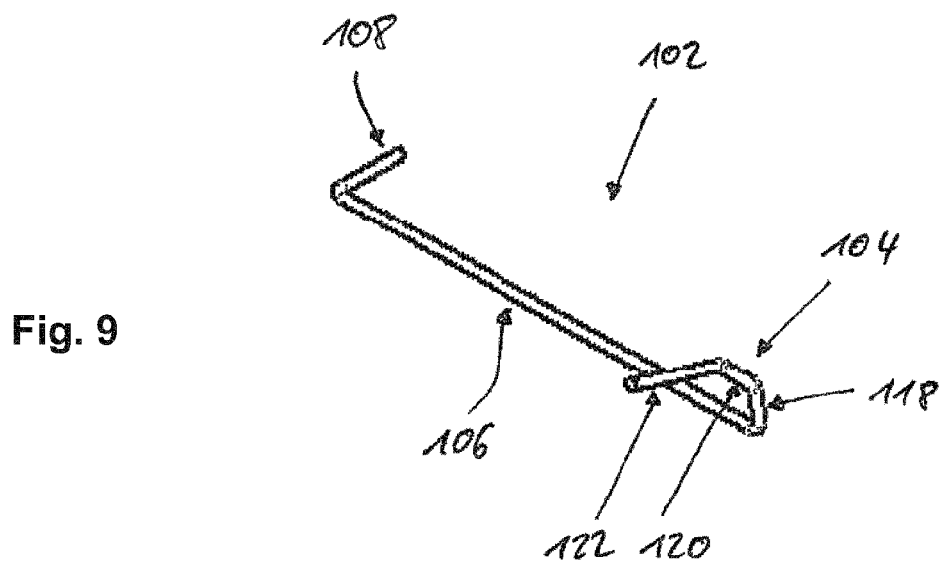
FIG. 9 is a perspective view of a torsion bar spring.

As particularly shown in FIG. 9, each torsion bar spring 102, 102' has at least one of spring body 106, 106' and at least two legs 104, 104', 108, 108' extending from the at least one of spring body 106, 106'. The torsion bar springs 102, 102' are arranged at the underside of the platform 16 such that each occupies approximately half the width of the platform 16. The first leg 104, 104' co-operates with the support pillars 10, 10' for biasing purposes and the second legs 108, 108' co-operate with the platform 16. Thus, respective abutments 11, 11' in the form of a substantially cylindrical projection are provided on an inwardly directed portion of the support pillar 10, 10' which co-operate with the first legs 104, 104' of the torsion bar spring 102, 102' to bias the platform 16 away from the support pillars 10, 10'. Moreover, two respective support blocks 63 of mirror-symmetrical configuration are arranged at the lateral ends on the platform 16, as was already described hereinbefore. Each support 42, 42' has a through bore 35, through which the first legs 104, 104' of the torsion bar springs 102, 102' extend to come into contact with the abutments 11, 11' on the support pillars 10, 10'. The second legs 108, 108' of the torsion bar springs 102, 102', at the opposite ends of the spring bodies 106, 106', are fixedly connected to the platform 16. For that purpose the second legs 108, 108' are screwed fast to the platform 16 by means of clamping holders 110, 110'.

The first legs 104, 104' of the torsion bar springs 102, 102' are not fixedly connected to the abutments 11, 11' on the support pillars 10, 10'. Instead, the first legs 104, 104' only bear against the abutments 11, 11'. Thus, it is possible for the legs 104, 104' to lose contact with the abutments 11, 11' from a certain angle of pivotal movement of the platform 16 relative to the support pillars 10, 10'. As such, force is no longer exerted on the abutments 11, 11', which makes it possible for the platform 16 to be biased only for example at the beginning of the pivotal movement from the first retracted position of the vehicle lift 1 into the second extended position. As a result it is sufficient for the torsion bar springs 102, 102' to have a relatively short spring travel, which also simplifies the structure.

As can be seen in particular in FIGS. 6 and 8, the torsion bar springs 102, 102' are arranged at the underside of the platform 16 and are accessible therefrom. Because the torsion bar springs 102, 102' are connected fixedly with the second leg 108, 108' to the platform 16 by means of the clamping holders 110, 110' and extend with the first legs 104, 104' through the supports 42, 42', the torsion bar springs 102, 102' are substantially fixed to the platform 16. In addition, the torsion bar springs 102, 102' are partially covered by means of two respective mounting plates 112, 114 (of which only two are shown in FIG. 6; the two mounting plates of the torsion bar spring 102' are omitted for illustration purposes). The mounting plates 112, 114 are fixed to the platform 16 by means of screws 116 (only one is provided with references in FIG. 6). The mounting plates 112, 114 serve, on the one hand, to protect the torsion bar springs 102, 102' from damage, such as, for example, by impacts or abrasion against a ground. In addition, the mounting plates 112, 114 protect a user from injury.

Moreover, in the event that one of the torsion bar springs 102, 102' becomes defective, the defective one of the torsion bar springs 102, 102' can be particularly easily replaced. Firstly, the vehicle lift 1 is to be moved preferably into the intermediate position in which the platform 16 is oriented horizontally, such that the platform 16 is at the level of the vehicle, not on the ground. Alternatively, the vehicle lift 1 is to be moved into any other position in which the torsion bar springs 102, 102' are relieved of load, such that the first legs 104, 104' are not in contact with the abutments 11, 11'. Then, the mounting plates 112, 114 are to be removed first. Thereafter, the clamping holders 110, 110' can be opened so that the second legs 108, 108' are released. The torsion bar springs 102, 102' are then to be removed, with the first legs 104, 104' being passed through the through holes 41, 41' of the supports 42, 42'. After this dismantling process, new torsion bar springs 102, 102' can be fitted in a similar fashion. It will be readily apparent that this replacement process is easy and may be completed without taking a great deal of time and tools so that maintenance of the vehicle lift 1 is substantially simplified.

The torsion bar springs 102, 102' can be formed from a simple spring steel. Preferably, the torsion bar springs 102, 102' are of a diameter of between 5 and 15 mm, particularly preferably 8 mm. This thickness gives an adequate spring force to bias the vehicle lift 1 into the second extended position. As can be seen with particular reference to FIGS. 7c and 9, the spring bodies 106, 106' are substantially in the form of an elongate straight bar and do not have any bends or the like. Preferably, the spring bodies 106, 106' are of a length of between about 350 and 400 mm. The second legs 108, 108' are also substantially in the form of a straight bar and preferably at an angle of about 90° relative to the spring bodies 106, 106'. Thus, the torsion bar springs 102, 102' may be easily fitted while moment forces can be advantageously applied to the torsion bar springs 102, 102'. In this embodiment, the first legs 104, 104' have substantially three portions 118, 118', 120, 120', 122, 122' (see FIGS. 7c and 9). The three portions 118, 118', 120, 120', 122, 122' together form legs 104, 104' which are curved approximately in the shape of a circular arc. Because the first legs 104, 104' are curved in a segmented fashion, the spring travel and thus, also the application of forces to the torsion bar springs 102, 102' or the biasing in the platform 16 relative to the support pillars 10, 10', can be adjusted. Preferably, the legs 104, 104' also involve an angle of approximately 90° relative to the spring bodies 106, 106'. The first portions 118, 118' of the first legs 104, 104' are preferably at an angle of between 90 and 100° to the second legs 108, 108'. The individual portions 118, 118', 120, 120', 122, 122' of the first legs 104, 104' are preferably approximately at an angle of between 140 and 150° relative to each other. The lengths of the individual portions 118, 118', 120, 120', 122, 122' are selected such that the torsion bar springs 102, 102' come into contact with the portions 122, 122' with the abutments 11, 11' of the support pillars 10, 10'.

Figure 10:
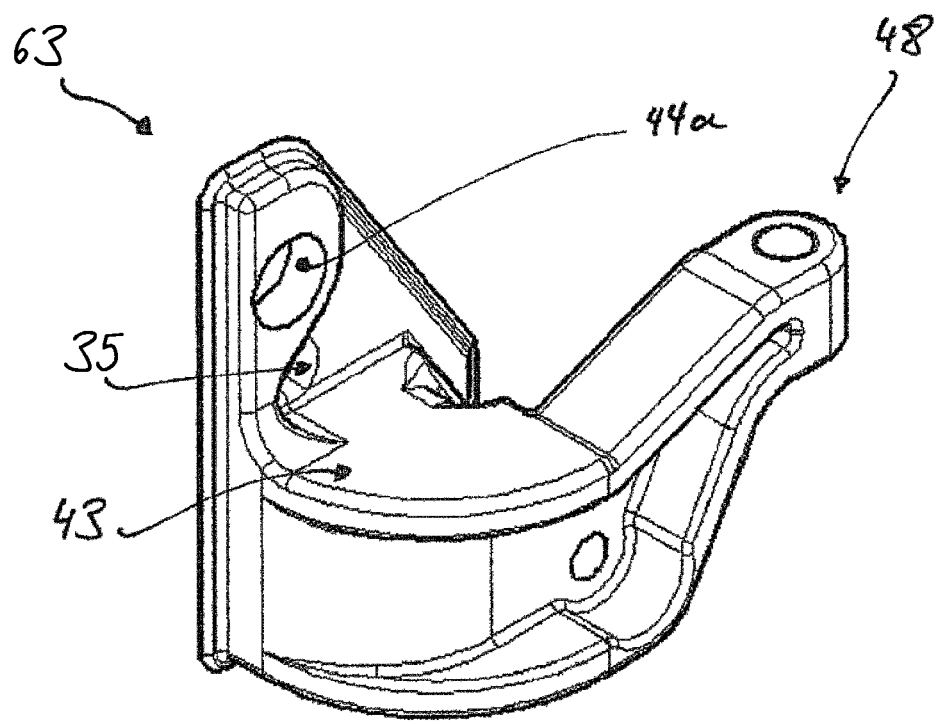
FIG. 10 is a perspective view of a support.

FIG. 10 additionally shows the support 42. The support 42 has a main body 43 and an arm-shaped projection 48 extending therefrom, serving as an abutment. The support 42 can be screwed to the platform 16 by means of the main body 43. As shown in more detail in FIG. 3, a through bore 44a for receiving the hinged connection 44 is provided in the main body 43. The support 42 is produced in the form of a free-form casting in order to optimize the configuration with respect to weight so that the weight of the vehicle lift 1 is reduced.

The invention claimed is:
1. A vehicle lift for use with a vehicle, comprising:
a first support pillar;
a platform pivotably connected to the first support pillar along a horizontal pivot axis, the platform including an underside and being sized to receive a wheelchair;
a lifting device hingedly connected to the first support pillar to thereby connect both the first support pillar and the platform to the vehicle, the lifting device configured for lifting and lowering the first support pillar and the platform between a retracted position in which the platform is disposed substantially vertically relative to a ground surface external to the vehicle and an extended position in which the platform is disposed substantially horizontally relative to the ground surface; and
a biasing device configured to bias the platform to move relative to the first support pillar and towards the extended position, the biasing device acting in the region of the pivotal connection between the platform and the first support pillar,
the biasing device including a first torsion bar spring having an elongate bar-shaped spring body and first and second legs extending from the spring body, the first and second legs being configured to apply a moment force to the spring body, wherein the first leg engages a first portion of the first support pillar and the second leg engages a second portion of the platform,
wherein the spring body is arranged at the underside of the platform and substantially in a plane of the platform, the spring body extending substantially along the platform when the platform is in at least the extended position, and the spring body extending along an elongate length of the spring body substantially parallel to and along the pivot axis of the platform.
2. The vehicle lift of claim 1 wherein the biasing device further includes a second torsion bar spring, the vehicle lift further comprising:
a second support pillar pivotably connected to the platform, wherein the second torsion bar spring acts in the region of the pivotal connection between the platform and the second support pillar and is configured to bias the platform into the extended position.
3. The vehicle lift of claim 1 wherein the lifting device further comprises:
a parallelogram linkage pivotably connected to the first support pillar, the parallelogram linkage configured to lift and lower the first support pillar and the platform substantially perpendicularly to the pivot axis;
a plurality of support arms arranged substantially parallel to each other, each support arm having a first end and a second end; and
a vehicle-side fixing portion mountable to a side of the vehicle,
wherein the first end of each support arm is pivotable with respect to the first support pillar and the second end of each support arm is pivotable with respect to the vehicle-side fixing portion.

4. The vehicle lift of claim 3 wherein the first support pillar is formed from an aluminum profile member.

5. The vehicle lift of claim 3 wherein the support arms are formed from aluminum profile members.

6. The vehicle lift of claim 1 further comprising:
a mechanism having an elbow lever with a first leg and a second leg connected with the first leg in an elbow-hinge relationship, and the mechanism is operable to pivot the platform such that the first leg is pivoted toward the first support pillar and the second leg is pivoted toward the platform.

7. The vehicle lift of claim 1 further comprising:
a plurality of side plates arranged on the platform, each side plate having a stamping.

\* \* \* \* \*